MAGNETIC SWITCHING DEVICE

Filed March 2, 1953 5 Sheets-Sheet 1

INVENTOR.
JAN A. RAJCHMAN
BY Morris A. Rabkin
ATTORNEY

Feb. 19, 1957 J. A. RAJCHMAN 2,782,399

MAGNETIC SWITCHING DEVICE

Filed March 2, 1953 5 Sheets-Sheet 2

INVENTOR.

JAN A. RAJCHMAN

BY Morris A. Rabin

ATTORNEY

INVENTOR.
JAN A. RAJCHMAN
BY Morris A. Rabkin
ATTORNEY

Feb. 19, 1957 J. A. RAJCHMAN 2,782,399

MAGNETIC SWITCHING DEVICE

Filed March 2, 1953 5 Sheets-Sheet 4

INVENTOR.
JAN A. RAJCHMAN

BY Morris A. Rabkin

ATTORNEY

Feb. 19, 1957 J. A. RAJCHMAN 2,782,399

MAGNETIC SWITCHING DEVICE

Filed March 2, 1953 5 Sheets-Sheet 5

INVENTOR
JAN A. RAJCHMAN
BY Morris Rabkin
ATTORNEY

United States Patent Office 2,782,399

Patented Feb. 19, 1957

2,782,399

MAGNETIC SWITCHING DEVICE

Jan A. Rajchman, Princeton, N. J., assignor to Radio Corporation of America, a corporation of Delaware Application March 2, 1953, Serial No. 339,861

17 Claims. (Cl. 340—174)

Figures 1, 2:
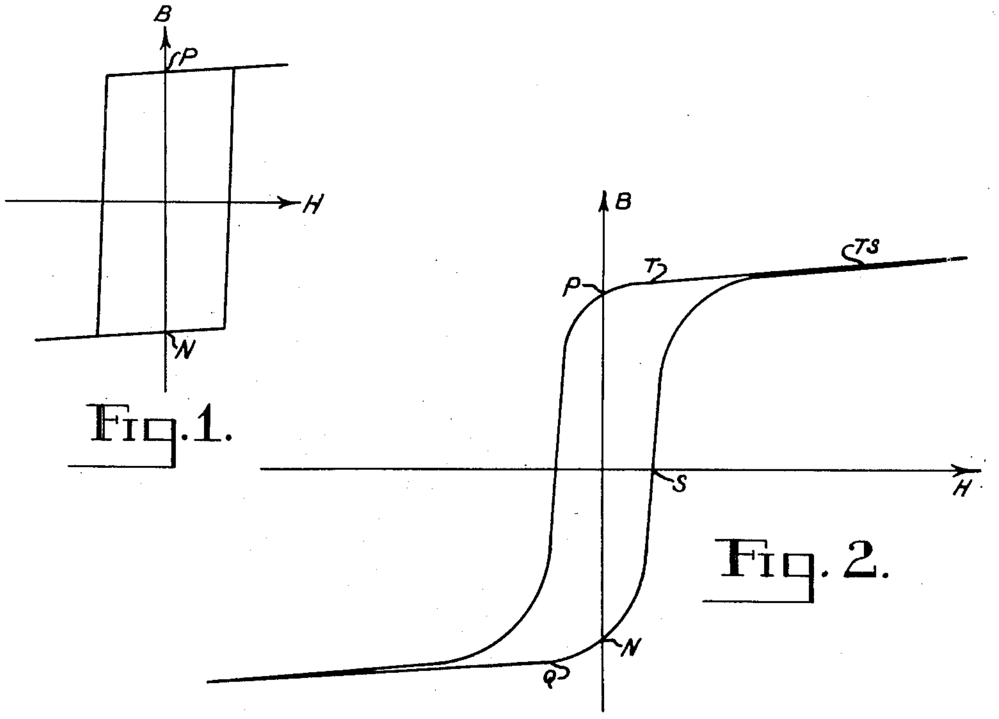

This invention relates to magnetic switches of the type wherein a plurality of magnetic cores have a plurality of selecting coils coupled thereto for the selection of a single one of said cores.

More particularly, this invention is an improvement in this type of switch.

In an article entitled "Static magnetic matrix memory and switching circuits," by this applicant, which was published in the RCA Review for June, 1952, the subject matter of which is described in detail in an application, Serial No. 275,622, filed March 8, 1952, and entitled "Magnetic Matrix and Computing Devices," now U. S. Patent 2,734,182 there is described a magnetic switch permitting the selection of one out of many channels, signified by the transmission of a pulse through the selected channel. These channels are the switch paths controlled by the respective magnetic cores which are initially in a state of magnetic saturation in one polarity. Core selection is made by means of selecting coils which are inductively coupled to the cores in accordance with a coupling code. One core out of the many is selected, by means of the selecting coils, to have its polarity of magnetic saturation reversed. In thus being driven, the output of the switch is a pulse induced in an output winding coupled to the driven core. Means are provided for establishing all the cores of a switch in a given polarity of magnetic saturation after each selection. Extremely rapid switching is possible with this type of system.

A number of other variations of magnetic switches have been described which are directed to switch improvements which provide reduction of the amount of copper required for the coils used in switching over the cores, reduction in the number of selecting coils required for selecting one of the many cores and reduction in the required rectangularity of the hysteresis curve of the core material to be used.

The present invention is directed to the method of and apparatus for using a magnetic switch for the purpose of switching to one out of many channels a modulated signal instead of a pulse, or conversely for selecting one out of many channels and conveying a modulated signal from the selected channel to a single channel.

A feature of this invention is the provision of a magnetic switch which has novel structure and permits switching of modulated signals.

It is difficult to switch a modulated signal through the magnetic core without some of the switching signal being modulated upon the signal being translated. A further feature of this invention is the provision of a magnetic switch which permits translation of modulated signals without unwanted signals from the switching action of the switch being modulated thereon.

These and other features of the invention are provided in a switch wherein, instead of the magnetic material being driven from saturation in one polarity to saturation in the opposite polarity, the magnetic cores are driven from the saturated to the substantially non-saturated region of their hysteresis characteristic. Modulated signals impressed upon a core when desaturated are translated therethrough. Other cores are provided which are simultaneously driven, with the switching core, to provide signals which are substantially equal and opposite to the unwanted switching signals and thus may be used for cancellation of the unwanted signals.

The novel features of the invention, as well as the invention itself, both as to its organization and method of operation, will best be understood from the following description when read in connection with the accompanying drawings, in which—

Figure 1 is a drawing of an ideal, substantially rectangular hysteresis characteristic, Figure 2 is a drawing of a typical hysteresis characteristic of a magnetic core.

Figure 3:
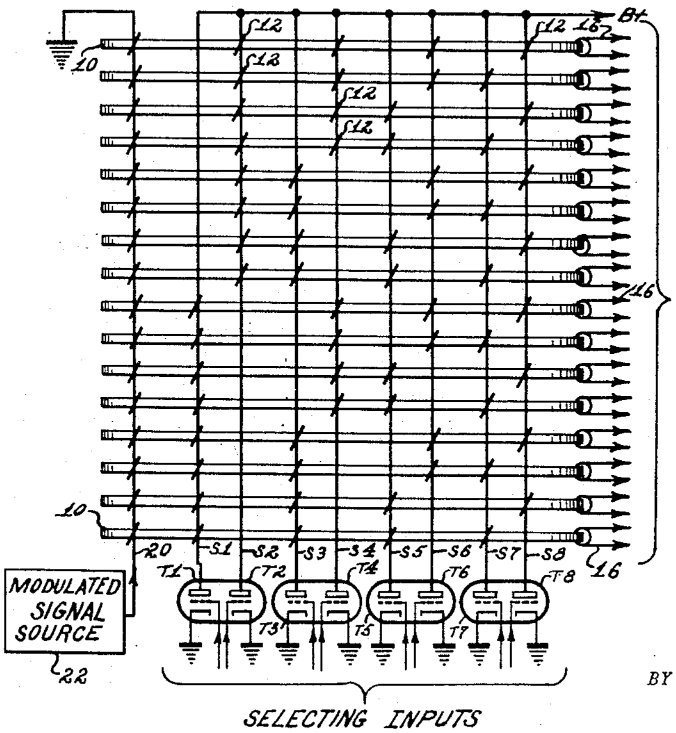
Figures 4, 7A:
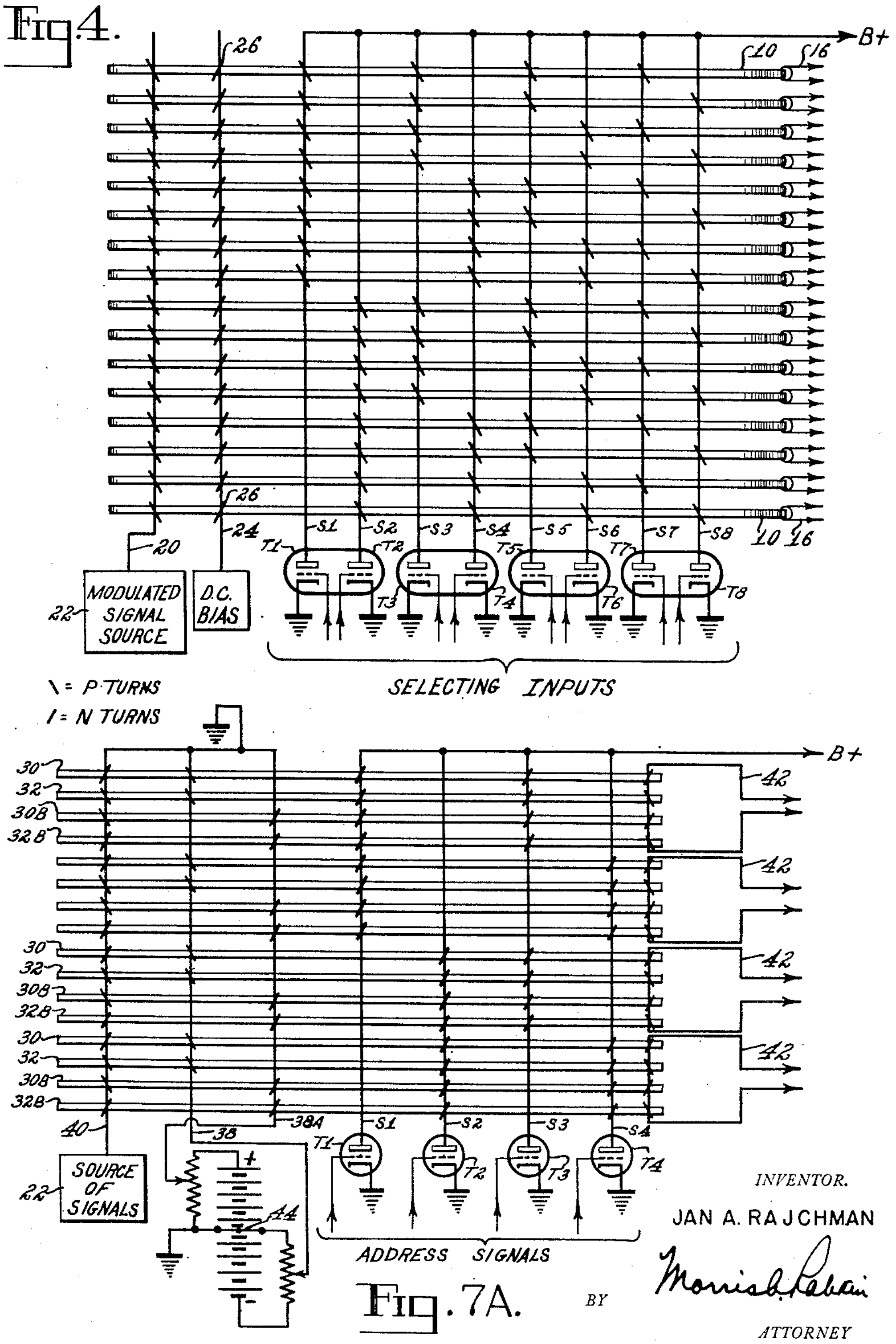
Figure 5:
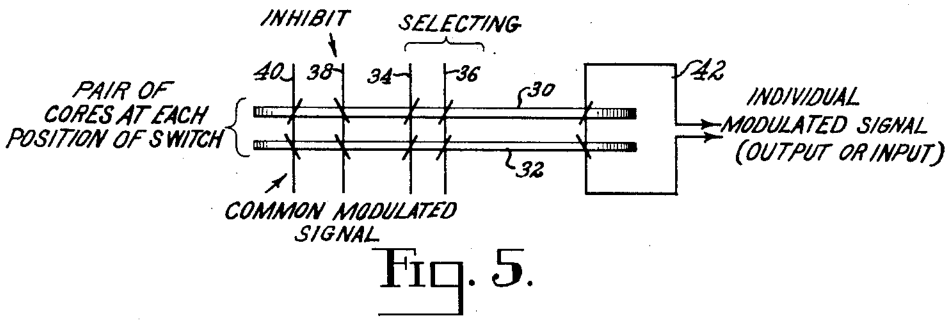
Figure 6:
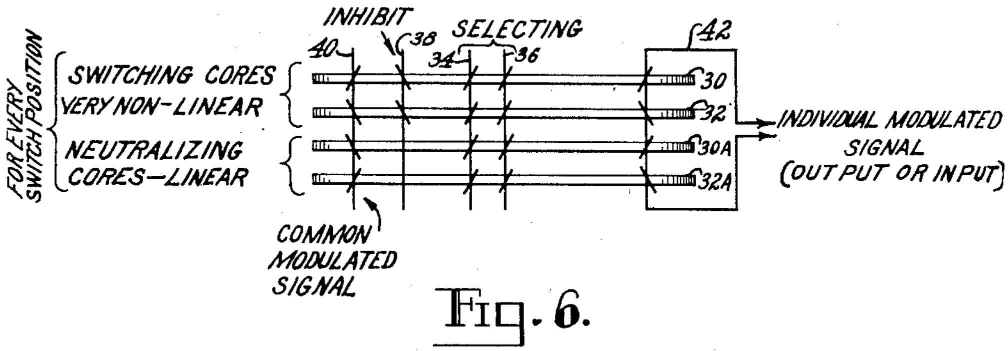
Figure 7:
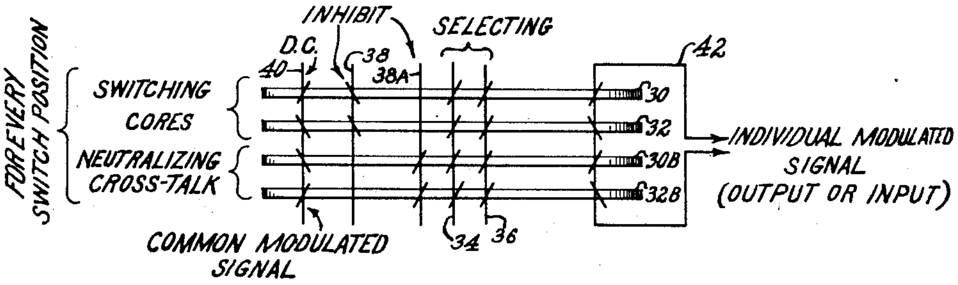
Figure 8:
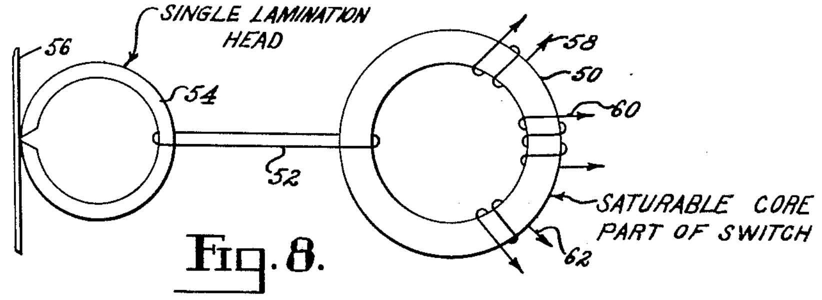
Figure 9:
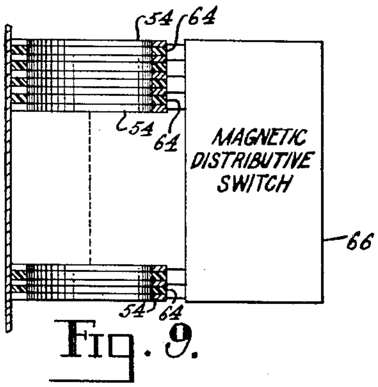
Figure 10:
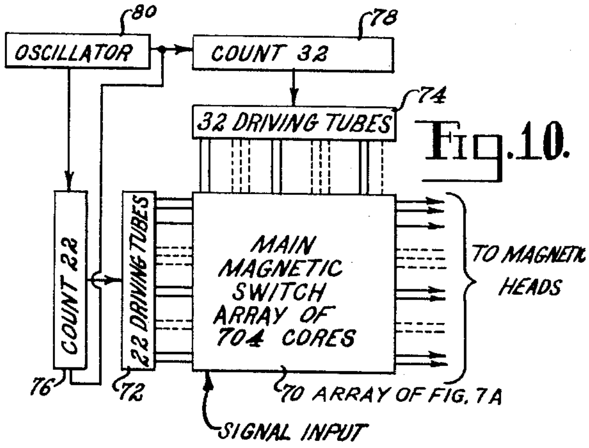
Figure 11:
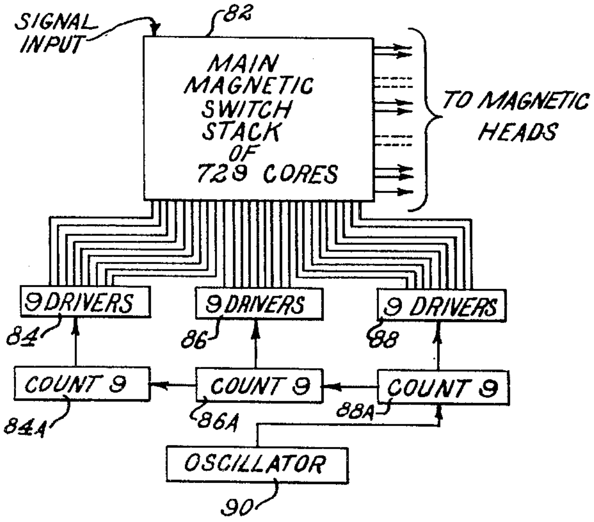
Figure 12:
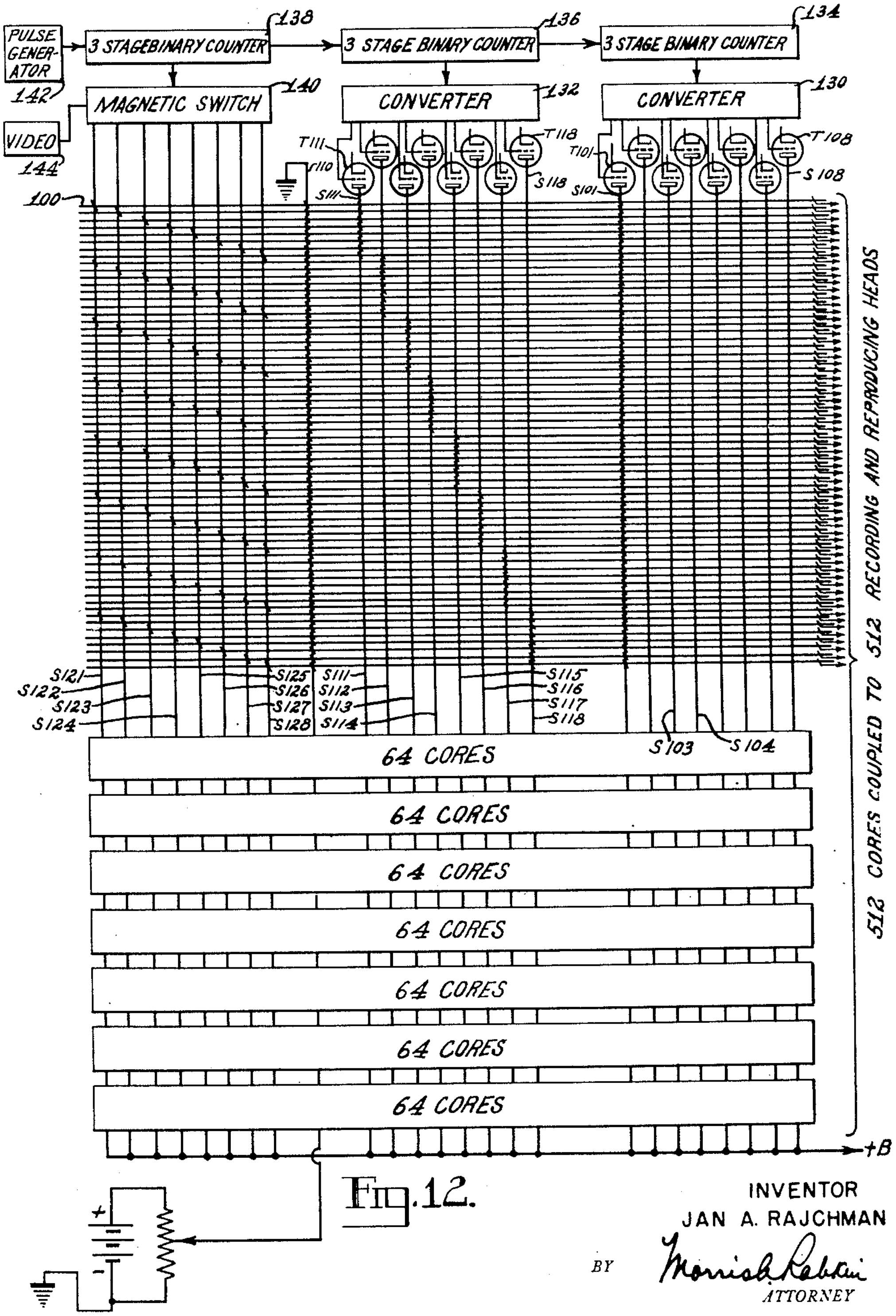

Figure 3 is one embodiment of the invention and shows one type of magnetic switch which may be used for transmitting or distributing modulated signals, Figure 4 is a schematic drawing of another embodiment of the invention showing a magnetic switch used for distributing modulated signals, Figures 5, 6 and 7 are three schematic drawings showing further embodiments of the invention. These drawings represent portions of magnetic switches which have incorporated structure for eliminating unwanted switching signals which are modulated upon the signals being translated, Figure 7A is a schematic drawing of a complete magnetic switch which embodies the invention shown in Figure 7, Figure 8 is a schematic drawing showing adaptation of the invention for the purpose of switching modulated signals to be recorded on tape, Figure 9 shows a sectional view of tape recording heads which may be used in conjunction with the magnetic switch embodying the present invention, and Figures 10, 11 and 12 show embodiments of the present invention employed for the purpose of recording signals such as television signals on magnetic tape.

Reference is now made to Fig. 1, which shows a substantially rectangular hysteresis loop characteristic for a magnetic core. This is an ideal loop. It will be apparent that if a core made of magnetic material is magnetized to a state represented by point N on the curve of its hysteresis characteristic, or at point P, the core is magnetically saturated. If two windings are placed on a saturated core, one winding having applied thereto alternating current signals, substantially no alternating current signals pass through the core to the other winding, since, in view of the magnetic saturation of the core, there is substantially no change caused by the alternating current signal in the lines of flux linking the two windings. However, if the magnetic core is magnetized to a state represented by a point in the region of its hysteresis curve where there is substantially little or no saturation, i. e., in the vicinity of the abscissa line, the lines of flux through the core can vary directly with the alternating current signal being applied thereto and this, in turn induces a varying voltage in a second winding upon the core.

The principle involved is a simple one. The magnetic switches as described heretofore in the article and application identified above, operate by driving the cores from saturation in one polarity to saturation in the opposite polarity. If, instead of being driven between saturable regions, a core is driven to a region of substantially no saturation, an alternating current signal applied to that core, either by an auxiliary winding which can be termed a signal inuut winding, or by coupling to any one of the windings which is coupled to the selected core, will be transmitted through that core to the output winding.

Referring to Fig. 3 of the drawing, there will be seen a magnetic switch which permits transmission of alternating current signals therethrough. The switch consists of a number of toroidal cores 10 made of low coercive force magnetic material and having magnetic characteristics, such as are shown in Figure 2. The cores may have any desired shape, but a toroidal shape is preferred. For the purpose of simplification of the drawing, the cores are represented as elongated rectangles. A number of selecting coils S1—S8 are provided which are coupled to the cores 10 in a desired coded fashion. Each selecting coil consists of a number of windings 12 which are wound on cores and which are connected in series. To simplify the drawings, the winding turns on a core are represented by a line making an acute angle with the core. The sense of the windings is represented by the direction of the acute angle. An acute angle to the left represents a P sense winding and an acute angle to the right an N sense winding. The vertical line connecting a number of such winding representative lines represents the serial connection of the windings to form a coil. The coils S1—S8 are arranged in pairs. The code of the coupling upon the cores 10 is a binary one. The first pair of coils S1, S2 is coupled to alternate halves of the cores; a second pair of coils S3, S4 is coupled to alternate quarters of the cores. The third pair of coils S5, S6 is coupled to alternate eighths of the cores. The last pair of selecting coils S7, S8 is alternately coupled to every other core. Each core has an output winding 16 coupled thereto. Each selecting coil S1—S8 is driven by a vacuum tube T1—T8 associated therewith. The coil serves as a plate load for the tube. The tubes are merely exemplary of a switch which can turn the current in a coil off or on.

A modulated signal is applied from a source 22 to all the cores of the switch by a signal input coil 20. The signal input coil is coupled to all the cores by serially connected windings. It is to be noted that, in the switch shown, the windings of all the coils have a single sense. This is to provide magnetomotive forces in an N going direction. Thus, in this embodiment of the invention, the selecting coils serve an inhibiting coil function.

If the cores are made of a magnetic material having a substantially rectangular hysteresis characteristic, a strong modulated signal, or alternating current signal, applied to the signal coil can drive any of the cores into the region of low magnetic saturation, in which case the alternating current signal can be transmitted through a core to its output coil. However, if one selecting coil out of each selecting coil pair has current passing through it by virtue of exciting or addressing the grids of the associated vacuum tubes, all but one of the magnetic cores will be inhibited against the action of the alternating current applied to the signal coil. That one core will transmit a modulated signal. For example, if the left coil S1, S3, S5, S7 in each pair is excited, that leaves the top core of the switch as the only core in the entire switch which does not have any inhibiting current applied thereto. The modulated signal will therefore be transmitted through the top switch core. This switch can also work in reverse. In other words, if modulated signals are applied to each one of the output coils 16, then only that signal in the output coil coupled to an uninhibited core will be transmitted to the single coil joining all the cores.

It is preferable, in order to assist in bringing the cores to an unsaturated condition, to apply, to the signal input winding, a direct current in a direction to desaturate the cores. However, in view of the inhibiting action of the selecting coils, this current only desaturates the selected core which is uninhibited by the selecting coil currents. Thus the function of desaturation is not solely performed by the modulated signal but may be assisted or entirely performed by the D. C. biasing current. The signal which is transmitted in this mode of operation suffers relatively little distortion as compared to the one transmitted in the first mode of operation.

Another form of magnetic switch, which is preferable to the one shown in Fig. 3, is shown in Fig. 4. The representation used for the cores, windings and coils is the same for both figures. It will be noted that the windings of the selecting coils are in a P going direction rather than in an N going direction. In the switch shown in Fig. 4, a D. C. bias is applied to a biasing coil 24 which is coupled by windings 26 to all cores in a direction to saturate the cores at all times. By applying exciting signals to the tube grids, current is applied to one of each pair of selecting coils to oppose the effects of the biasing coil. These curents are applied to all four windings on only one core 10, thereby to desaturate a single selected core. This is the core through which the modulated signal is transmitted.

In the switch shown in Fig. 4, the biasing coil 24 is inductively coupled to all the cores and the signal input coil 20 is inductively coupled to all the cores. The selecting coils S1—S8 are inductively coupled to the cores in accordance with a combinatorial system, which is the same as is shown in Figure 3. Each one of the selecting coils has associated therewith a vacuum tube T1—T8 for which it is the plate load. Selection of a coil for excitation is made by applying the proper signal to the grid of the associated vacuum tube. It is to be understood that these tubes are representative of switches which can be opened or closed as required in order to excite, with current, a selecting coil. One coil in each pair is excited in order to select a desired core through which the signal is to be transmitted.

The amplitude of the selecting coil currents should not be chosen to drive a selected core from saturation in polarity N to saturation in polarity P as has been done heretofore. Referring to the typical hysteresis characteristic curve shown in Fig. 2, the bias coil carries sufficient D. C. bias to drive the cores to position Q on the curve. The three excited selecting coils should provide a sufficient magnetomotive force to drive a selected core to position S on the characteristic curve. Upon removal of the selecting coil currents, the D. C. bias restores a selected core again to the point Q on the characteristic curve. The advantage of the switch shown in Fig. 4 over that shown in Fig. 3 is that the switch in Fig. 3 requires all the selecting coils to be excited in order that the switch be "inoperative" to transmit signals. Otherwise, all channels are open. The switch in Fig. 4 is only operative when the selecting coils are excited.

The point to which a selected core is driven need not necessarily be point S on Figure 2. Point S corresponds to complete desaturation. The selected core can be desaturated to a point anywhere between the positive and negative knees of the saturation curve and still function satisfactorily to transmit signals. The quality or faithfulness of the signal transmitted does depend, in some measure, on the completeness of the desaturation, i. e., to the bringing of the core to point S where the characteristic is linear; also, on the amplitude of the signal which can be transmitted without distortion.

Because the B–H characteristics of the available magnetic materials is more likely to have a hystersis characteristic such as shown in Fig. 2 rather than the ideal linear characteristics with sharp saturation point shown in Fig. 1, several detrimental effects may occur. First, a pulse may be transmitted in addition to the modulated signal when a selected core is driven from saturation to desaturation. Second, cores which have excitations applied thereto which are insufficient to drive them to position S and yet are sufficient to move them up toward the general direction of S, can transmit distorted modulated signals. Third, there can be some non-linear transmission of a modulation signal. These effects may be considerably reduced, if not eliminated, by the use of the structure shown in Figs. 5, 6 and 7.

Referring now to Fig. 5, there may be seen a single pair of cores 30, 32. This pair of cores may be substituted for every one of the cores 10 in the switch shown in Fig. 4. The selecting coils 34, 36 (of which only two are shown) as well as the biasing or inhibit coil 38 and signal input coil 40 are shown vestigially. This method of presentation is adopted in order to simplify the drawings and explanation of the invention. The two cores 30, 32 have identical hysteresis characteristics and are identically coupled at each core position in a switch to the selecting coils and to the biasing coil. The coupling of the signal input coil to each core is opposite and the coupling of the output coil 42 to each core is also opposite. As was previously mentioned, in order to obtain a linear response and have efficient operation through the switch core, it is desirable to drive it into the region of maximum permeability such as point S shown in Fig. 2. Switching into point S from any value, such as Q or to the left of Q, causes a large transient to be induced in the output as a result of the large flux change occurring in the core. With other cores which are not selected, but which are subject to P driving forces of less magnitude from the selecting coils, switching transients may also occur due to the fact that the characteristic to the left of point Q is not ideally flat, i. e., has a finite slope. In the system shown in Fig. 5, due to the output coil 42 being coupled to the pair of cores in opposing fashion, switching transients caused by the driving of both cores induce voltages which are in opposition in the output coil and which therefore neutralize each other. However, the desired modulated signals are transmitted through the cores which are selected and are added in the output coil, in view of the fact that the signal input coil is coupled in opposite fashion to the cores of each pair. The outputs for the switched and unswitched states of a core pair will be simply in the ratio of the slopes at the switch points, for example S and whatever unswitched point to the left of Q, the core may find itself to be in.

A further increase in the discrimination in the output coil between wanted and unwanted signals respectively in selected and unselected channels may be had by using, in addition to the above described scheme, a system which was described in application Serial No. 275,622. As is described in that application, magnetic material may be obtained which has a linear hysteresis characteristic. The desired characteristic is one which has substantially the negative reciprocal of the slope of the saturated regions of the hysteresis characteristics of the pair of cores for whose characteristics compensation is desired. Thus a characteristic curve of the linear core material may be represented by a straight line passing through the origin and having a slope which is the negative reciprocal of, for example, the slope of the curve, shown in Figure 2, in the saturated regions.

In Fig. 6, two of these linear characteristic cores 30A, 32A, plus the two non-linear characteristic cores, 30, 32 totaling four cores in all, are able to be substituted for each core in the magnetic switch shown in Fig. 4. The non-linear characteristic cores are coupled to the signal input coil 40, the biasing coil 38, the selecting coils 34, 36, and the output coil 42 in the same fashion as shown for the cores coupled to these coils in Figure 5. The two linear cores 30A, 32A are connected in opposing fashion to the windings of the signal input coil 40. They are also coupled in an opposing fashion to the output coil 42. These cores are coupled to the selecting coils in the same fashion as are their associated non-linear characteristic cores. The linear cores are not coupled to the inhibiting coil.

In operation, when any of these two pairs of cores are selected, the output signal will be less than that obtained using the non-linear cores alone by a very small amount due to signal transmission through the linear cores. In an unswitched condition or non-selected condition there will be no modulated signal transmitted through the non-linear cores, in view of the manner of coupling the signal winding and the output coil winding thereto to obtain signal cancellation. Where the four associated cores are not selected, but do receive magnetomotive forces of lesser amplitude from the selecting coils which cause magnetic excursions, any voltages induced in the output coil due to magnetic excursions of the non-linear cores is neutralized by voltages induced in the output coil due to the magnetic excursions of the linear cores, since the output coil is coupled in an opposing fashion to the respective cores and these magnetic excursions occur in the saturated regions of the core characteristics. In effect, this system eliminates "cross-talk." The ratio of signals of switched to unswitched cores will be greatly increased through the system of neutralization shown.

Still another system may be employed, in combination with the system shown in Figure 5, to eliminate unwanted signals. This system has been described in application Serial No. 322,973, filed November 28, 1952, by Jan A. Rajchman and R. Stuart-Williams, now U. S. Patent 2,666,151.

Reference is made to Fig. 7, wherein there are shown four cores. It is to be understood that these four cores 30, 32, 30B, 32B are substituted for every single core position shown in the switch of Fig. 4.

As before, the first pair of cores 30, 32 is the same, a pair of non-linear hysteresis characteristic cores, and these are coupled to the output coil 42, selecting coils 34, 36 and signal input coil 40 in the same fashion as shown in Figure 6.

A second pair of cores 30B, 32B similar to the first pair of cores are also shown, and these are coupled to the respective signal input coils 40, selecting coils 34, 36 and output coil 42 in the same manner as is the first pair of cores 30, 32. Two D. C. inhibit coils 38, 38A are provided. The first inhibit coil 38 is coupled to the first pair of cores 30, 32 and has current passing therethrough to bias the first pair of cores to position Q on the saturation curve shown in Fig. 2. The second pair of cores 30B, 32B are coupled to the second biasing coil 38A which has current passing therethrough to bias this second pair of cores to a position P on the saturation curve shown in Figure 2. Any magnetomotive force from the selecting coils which is less than that required to drive a selected pair of cores to position S on the hysteresis curve causes both pairs of cores to have a magnetic excursion. For example, a maximum "non-selecting" excitation is an excursion by the first pair of cores between points Q and N. Simultaneously, the second pair of cores are driven between points P and T, shown on the hysteresis curve in Figure 2. The voltages that are induced in the output coil from each pair of cores are the same, since both pairs of cores are biased so that they take the same magnetic excursion. These voltages cancel each other in view of the manner of the core coupling to the output winding. Accordingly, the non-selected cores will not provide any output voltage either from the switching operation or from the signal input coil.

In the switched or seelcted condition, one pair of cores 30, 32 is driven susbtantially to point S while the other pair of cores 30B, 32B is driven far into saturation to T3 or to the right of it as shown on the curve in Figure 2. Consequently, a large output will be provided by the first pair of cores due to the excursions around S as a result of the modulated signal. This is only very slightly diminished by any small magnetic excursions of the second pair of cores around T3 caused by the modulated signal.

This system also reduces cross-talk effectively, and is a system preferable to the one shown in Fig. 6, in that it is simpler to obtain magnetic cores having similar characteristics than to obtain magnetic cores which have linear characteristics which match, in a reciprocal fashion, the characteristics of associated cores in the saturated regions. The magnetic switches shown can be made to reproduce the modulated signal fairly linearly because it is possible to arrange the biasing currents and the switching currents so that the characteristic point S is in the very linear portion of the curve (ideally on the portions corresponding to zero saturation). It should further be made clear that the roles of the signal input and output coils may be reversed. Furthermore, inputs may even be applied to the selecting coils.

Figure 7A shows how a complete switch employing the system shown in Figure 7 appears. The reference numerals used in Figure 7A are the same as those used in Figure 7 for similarly functioning apparatus. The coupling pattern of the selecting coils S1, S2, S3, S4 is the same as that shown in Figure 4, except that for selecting coil coupling purposes the four cores at each core position are treated as one. The switch shown employs four sets of four cores; however, this is not to be construed as a limitation, since, by employing the principles illustrated, a switch of any desired size can be built. The selecting coils S1—S4 serve as plate loads for the vacuum tubes T1—T4 to which address signals are applied. A source of alternating current or modulated signals is connected to the input coil 40. This coil is coupled to the four cores in each set in the manner shown in Figure 7. A source of direct current bias 44 is provided for the two biasing windings and an output coil is coupled to the four cores in each set in the manner shown in Figure 7. Operation of the switch is as heretofore described. Substantially no signals pass from the input coil to the output coil until a desired selection is made by applying exciting signals to the grid of one tube in each pair. Signals are then passed from the input to the output coil through the selected core set in the manner described for Figure 7.

Figure 8 shows a system whereby a magnetic switch of the type described may be coupled with the magnetic transducer head for magnetic tape for the purpose of recording signals. A core 50 of a magnetic switch (not shown here) is coupled by its output coil 52 to a magnetic tape reading-writing or transducer head 54. This head may consist of a single lamination or several thin sheets of high permeability low coercive force magnetic material having the circular shape shown in the drawing and having a gap proximal to the magnetic tape 56. The magnetic core shown in Fig. 8 has thereon a number of windings which are representative of the selecting coil windings 58, inhibiting winding 60 and signal input winding 62. Each core, or set of cores in a switch of the type shown in Figures 5, 6 or 7 may be coupled, in the manner shown in Fig. 8, to a separate magnetic tape head. Each core, 50, when it is in its desaturated condition, can transmit modulated signals to its output coil 52 and thereby to the magnetic transducing head 54, which then records these signals on the magnetic tape 56 in the fashion well known to the art. In reading, a signal detected by the transducing head is coupled to the magnetic core through the output winding and thus a signal may be transmitted to the input winding by desaturating the core exactly in reverse to the process of writing.

If each head is made not of one, but of several thin sheets of magnetic material which have good linearity in the non-saturated region, these heads may then be stacked together with alternate sheets of insulating material, having the same shape as the head, to form a single unit. Figure 9 is a cross-section of a stack of magnetic tape reading heads 54 which are stacked together with alternating sheets of insulating material 64. Each one of these heads is coupled to a different core in a magnetic switch in similar fashion as is shown in Figure 8. The magnetic switch is represented by a rectangle 66, and the coupling between each head and each core by a line. If ten laminations per head are used, each lamination being .0005 inch thick, and the heads are spaced from one another by .005 inch, then a stack of 500 heads may be used with a tape which is a minimum of 500 × .010 inch, which equals 5 inches wide. Thus a tape slightly in excess of 5 inches can be used to record signals from 500 read-write heads.

A 525 horizontal line television picture requires about 700 elements to obtain the same horizontal and vertical definition as are obtained with a cathode ray tube. A magnetic switch and tape system such as has been described may be employed to switch the video signals to the tape heads so that they may be recordded on the tape and subsequently read.

Many switching systems are possible. A switch may be arranged to employ double coincidence (simultaneous current in two selecting coils coupled to a core) and be in the form of an array. This array can have 704 magnetic cores arranged in 32 columns and 22 rows. Each row of cores has a separate coil coupled to all the cores and known as row coils. Each column of cores has a separate coil coupled to it known as a column coil. Each core requires a double coincidence in order to be driven from point Q to point S on its hysteresis curve. Such double coincidence is provided by the excitation of a row and a column coil which are coupled to the core. An array of cores arranged with row and column coils and using double coincidence may be seen by reference to Figure 1 of the RCA Review article previously mentioned. A magnetic switch array may also be seen in an application Serial No. 337,902, filed February 20, 1953, now U. S. Patent 2,734,184 by this applicant and assigned to the same assignee.

In Figure 10 of the drawings, such an array is represented as a rectangle 70, since there are at least 704 cores in the switch array. It will be appreciated, however, that in this array any one of the systems shown in Figures 4 through 7 may be used. Thus, the switch array of Fig. 10, as indicated by the legend, may be an array such as illustrated by Fig. 7, and shown fully in Fig. 7A. Only, however, there are two selecting coils (called here a row and a column coil), coupled to each set of cores. Each core is coupled via an output coil (not shown) to a different magnetic head. There are 704 of the heads, which may be stacked in the manner shown in Figure 9, and arranged across a magnetic tape. The cores are driven so that each core transmits a different signal element of a horizontal line of the television signals to the heads, which record them on the tape. The vertical motion of the tape will correspond to the vertical scanning. Each column coil and each row coil has its own driving tube associated therewith. Thus, there are 22 driving tubes represented by a rectangle 72, for the row coils and 32 driving tubes represented by a rectangle 74 for the column coils. Each coil serves as a plate load for its associated tube in the manner of the tubes and selecting coils in Figures 3 and 4. A 22 count ring counter 76 and a 32 count ring counter 78 respectively drive the drivers of the row and column coils. These counters may be of the type described on page 612 of a book by Chance et al., entitled "Waveforms," and published by the McGraw-Hill Book Company, Inc.

A single oscillator is used for the purpose of driving the counters so that synchronism between these counters and the television frequency may be obtained. Any of the well-known stable types of oscillators may be used. Any method of operating the counters to achieve scanning of the cores may be used. One way is to have the oscillator drive the 22 count ring counter 76. The output of this counter at the completion of every cycle is applied to the 32 count ring counter 78. The cores are coupled to the magnetic heads so that their outputs to the respective heads will appear in sequence on the tape. A signal input coil (not shown) is coupled to all the cores of the switch 70, as is previously shown herein. The television signal is applied to this input coil. As each core is successively desaturated, it translates a portion of the television signal to its associated magnetic head which records it on the magnetic tape. The oscillator frequency is determined as the frequency which will cause all the 704 cores to be scanned in the interval required to scan one horizontal line. The speed of the magnetic tape travelling past the heads is arranged to coincide with the vertical scanning frequency for a television picture.

Another arrangement for using a magnetic switch for recording television signals is shown in Fig. 11. Instead of the magnetic cores being arranged in columns and rows, they are stacked one above the other in the manner shown in Figures 3 or 4. In view of the number of cores, the stack is shown as a rectangle 82. Triple coincidence is used in this particular form of the switch. The selecting coils (represented by lines entering the rectangle) are arranged in three groups of 9. Each coil is driven by an associated driver tube. Nine driver tubes are represented by a rectangle 84, 86, 88. In the first group 84, the 9 selecting coils are each coupled to a different group of 81 cores (not shown). Each one of the second group of selecting coils is coupled to nine different cores in each of the 81 cores in the primary groups. The third group of coils has each coil coupled to a different core in each subgroup of 9 cores. Accordingly, a core is selected by having one coil in each of the three groups of 9 selecting coils excited simultaneously. This switch may be driven by having three ring "9 counters" 84A, 86A, 88A respectively coupled to drive in the above indicated sequence the driver tubes associated with the coils in the three selecting coil groups. The first counter 84A excites one coil while the second counter 86A goes through its complete 9 count. The third counter 88A is allowed to run through its complete 9 count while the second counter is exciting one coil. Therefore, the frequencies by means of which the three counters are driven by the oscillators 90 are related in accordance with the base 3. In this way the cores are successively desaturated and then saturated. This can be easily achieved by using three ring counters. The oscillator drives the third counter 88A. An output from the third counter at the completion of its cycle is used to drive the second counter 86A. Similarly, an output from the second counter is used to drive the first counter. Each switch core is coupled to an output coil which is coupled to a recording head as shown previously. A signal input coil (not shown) coupled to all the cores, has the video signal applied thereto translated to the magnetic recording heads successively. The frequency at which the magnetic switch is scanned is the frequency of one horizontal television line. The system is a reciprocal one. The signals on the tape may be read back into the signal input coil by scanning the cores in the manner recited above while moving the tape having the recorded signals past the heads.

Actually, because of the band width of a television channel, horizontal resolution is usually not as good as vertical resolution, so that 512 horizontal elements are an ample number for an acceptable picture. This figure permits purely binary counters to be used. By using a triple coincidence in the main switch, three groups of 8 selecting coils may be used. Referring to Fig. 12, a system for switching television signals for recording on tape, using 512 cores, is shown. The first of 64 cores 100 are shown drawn as horizontal lines. The remaining groups of 64 cores are drawn as rectangles. These cores have coupled thereto a first group of eight selecting coils, S101–S108, each coil of which is inductively coupled to a different group of 64 cores. A second group of eight selecting coils S111–S118 is employed in which each selecting coil is inductively coupled to a different eight cores in each of the 64 core groups. A third group of coils is employed, S121–S128, each of which is inductively coupled to a different one of the cores in each of the eight core subgroups. This third group of coils constitutes the signal input coils. There is also provided a direct current inhibiting coil 110. Each one of the coils in the first and second groups of coils is driven by an associated vacuum tube, T101–T108, T111–T118. Each of these tubes is excited in turn from a binary to octal converter 130, 132, excited by a three-stage binary counter 134, 136 driven at a proper frequency. The signal input coils are each coupled to a magnetic core in an eight-core magnetic switch 138 similar to the switches previously described herein. The magnetic switch 140 has its selecting coils addressed by a three-stage binary counter 138 by means of which they are scanned in sequence. A pulse generator drives this counter 138 which, when it completes its cycle, supplies a pulse to drive the following counter 136 which in turn supplies a pulse on completion of its cycle to drive the counter 134 which drives the converter 130, which drives the first set of selecting coils. A suitable type of binary to octal converter may be found described on page 42 of "High Speed Computing Devices," a book by Engineering Research Associates.

The video signal is applied from a video signal source 144 to all the cores in the eight-channel switch. Each one of these cores is successively desaturated. The rate of driving the second group of coils is eight times the rate of driving the first group of coils and the rate of driving or desaturating the eight way switch cores is eight times the rate of driving the second group of selecting coils. These rates are established so that the complete switch of 512 cores is scanned within the period of one horizontal scanning line of a television picture signal. Each one of the cores of the 512 core switch has an output coil inductively coupled to a separate transducing head. The first group of selecting coils permits selection of any group of 64 cores, the second group of selecting coils permits selection of a group of eight coils within the selected 64 cores, and the signal input coil selects one of the group of eight cores and applies the video signal thereto. Actually, desaturation is performed by the coincident operation of coils in the first and second selecting coil groups, and selection of a core to which signal is applied is obtained by the operation of the eight-channel switch.

Use of the systems for eliminating unwanted signals, such as are shown in Figs. 5, 6 and 7, requires that the number of cores be either doubled or quadrupled, depending upon which of the systems shown is used. It is to be understood that the systems described in Figs. 10 and 11 also permit the employment of the noise or unwanted signal cancelling structure and also use, in addition to the selecting coils, D. C. biasing coils and a common signal input coil.

There has been shown and described hereinabove a novel and useful magnetic switch system which suppresses unwanted signals, is employable for distributing modulated or alternating current signals, and can also be employed in the recording of television signals.

What is claimed is:

1. A distributive switching system comprising a plurality of magnetic members capable of being magnetically saturated and desaturated, input coil means coupled to each of said members, output coil means coupled to each of said members, means to apply an alternating current signal to said input coil means, means to drive to saturation all said members, and means including selecting coils coupled to said members in accordance with a combinatorial code to selectively drive a desired one of said members from said saturation to desaturation to transmit said signal to said output coil means only through said selected desired one of said members.

2. A distributive switching system comprising a plurality of magnetic members capable of being magnetically saturated and desaturated, input coil means coupled to each of said members, output coil means coupled to each of said members, means to apply an alternating current signal to said input coil means, means to drive to saturation all said members, and means including selecting coils coupled to said members to selectively drive a desired one of said members from said saturation to desaturation to transmit said signal to said output coil means only through said selected desired one of said members, said means to selectively drive a desired one of said members to desaturation including means to inhibit said members and also means to selectively excite said selecting coils to leave said desired one of said members uninhibited, and characterized by the addition of means to apply a biasing current to said desired one of said members to assist the drive to desaturation.

3. A distributive switching system comprising a plurality of magnetic members capable of being magnetically saturated and desaturated, input coil means coupled to each of said members, output coil means coupled to each of said members, means to apply an alternating current signal to said input coil means, means to drive to saturation all said members, and means including selecting coils coupled to said members to selectively drive a desired one of said members from said saturation to desaturation to transmit said signal to said output coil means only through said seelcted desired one of said members, said means to saturate all said members including a biasing coil inductively coupled to all said members and means to excite said biasing coil to drive said members to said saturation, and said means to selectively drive to desaturation a desired one of said members including means to selectively excite said selecting coils to apply to said desired one of said members desaturating magnetomotive forces.

4. A magnetic distributive switch comprising a plurality of magnetic cores, input coil means inductively coupled to each of said cores, output coil means inductively coupled to each of said cores, means to apply an alternating current signal to said input coil means, means to saturate all said cores at one polarity of magnetic saturation, and means to selectively drive a desired one of said cores from said saturation to desaturation including means to drive said desired core toward magnetic saturation in the opposite polarity, and a plurality of selecting coils inductively coupled by windings to said plurality of magnetic cores in accordance with a desired combinatorial code, substantial transmission of said signal to said output coil means occurring only through said desired one of said cores.

5. A magnetic distributive switch comprising a plurality of magnetic cores, means to drive all said cores to magnetic saturation, means to selectively maintain all but a desired one of said cores at said magnetic saturation including a plurality of selective inhibiting coils inductively coupled by windings to said cores in accordance with a desired combinatorial code, output coil means inductively coupled to each of said cores, and means to apply an alternating current signal to each of said cores, substantial transmission of said signal to said output coil means occurring only through said desired one of said cores.

6. A magnetic distributive switch comprising a plurality of magnetic cores, means to saturate all said cores at one magnetic polarity including an inhibiting coil inductively coupled to all said cores and means to apply a direct current bias to said inhibiting coil to bias all said cores to a desired magnetic saturation, a plurality of selecting coils inductively coupled to said cores in accordance with a desired combinatorial code, means to selectively excite said selecting coils to drive a desired one of said magnetic cores to desaturation from said saturation, an input coil inductively coupled to all said cores, means to apply an alternating current signal to said input coil, a plurality of output coils each of which is inductively coupled to a different one of said cores, substantial transmission of said alternating current signal to an output winding occurring only through said desired desaturated core, and means to substantially eliminate unwanted output signals at each core.

7. A magnetic distributive switch comprising a plurality of magnetic cores, means to saturate all said cores at one magnetic polarity including an inhibiting coil inductively coupled to all said cores and means to apply a direct current bias to said inhibiting coil to bias all said cores to a desired magnetic saturation, a plurality of selecting coils inductively coupled to said cores in accordance with a desired combinatorial code, means to selectively excite said selecting coils to drive a desired one of said magnetic cores to desaturation from said saturation, an input coil inductively coupled to all said cores, means to apply an alternating current signal to said input coil, a plurality of output coils each of which is inductively coupled to a different one of said cores, substantial transmission of said alternating current signal to an output winding occurring only through said desired desaturated core, and means to substantially eliminate unwanted output signals at each core, wherein said means to substantially eliminate unwanted output signals at each core includes a second plurality of magnetic cores, each of which is paired with and selected to have similar magnetic characteristics as a different one of said first plurality of cores, said selecting coils being coupled in similar fashion to each core of said second plurality of cores as they are coupled to the respective cores of said first plurality of cores with which they are paired, said biasing coil being coupled to each of said second plurality of cores, said input coil being coupled to each of said second plurality of cores in an opposite sense to its coupling to the respective cores of said first plurality of cores, and each of said output coils being coupled to a different one of said second plurality of cores in an opposite sense to its coupling to the respective different ones of said first plurality of cores.

8. A magnetic distributive switch as recited in claim 7 wherein said means to substantially eliminate unwanted output signals at each core also includes a pair of linear magnetic cores for each pair of cores in said switch, said input coil being coupled to one core of each pair of linear cores in opposition to its coupling to the other core of each pair, said selecting coils being coupled to each of said pairs of linear cores in similar fashion to their coupling to each said pair of cores with which said pair of linear cores are associated, and each of said output coils also being coupled to one core of a pair of linear cores in opposition to its coupling to the other core of said pair, each said pair of linear cores having their magnetic characteristics selected to be substantially similar to the linear magnetic characteristics of their associated pair of cores in their regions of magnetic saturation.

9. A magnetic distributive switch comprising a plurality of magnetic cores, means to saturate all said cores at one magnetic polarity including an inhibiting coil inductively coupled to all said cores and means to apply a direct current bias to said inhibiting coil to bias all said cores to a desired magnetic saturation, a plurality of selecting coils inductively coupled to said cores in accordance with a desired combinatorial code, means to selectively excite said selecting coils to drive a desired one of said magnetic cores to desaturation from said saturation, an input coil inductively coupled to all said cores, means to apply an alternating current signal to said input coil, a plurality of output coils each of which is inductively coupled to a different one of said cores, substantial transmission of said alternating current signal to an output winding occurring only through said desired desaturated core, and means to substantially eliminate unwanted output signals at each core, wherein said means to substantially eliminate unwanted output signals at each core includes a second plurality of magnetic cores, each of which is paired with and selected to have similar magnetic characteristics as a different one of said first plurality of cores, said selecting coils being coupled in similar fashion to each core of said second plurality of cores as they are coupled to the respective cores of said first plurality of cores with which they are paired, said biasing coil being coupled to each of said second plurality of cores, said input coil being coupled to each of said second plurality of cores in an opposite sense to its coupling to the respective cores of said first plurality of cores, and each of said output coils being coupled to a different one of said second plurality of cores in an opposite sense to its coupling to the respective different ones of said first plurality of cores, and wherein said means to substantially eliminate unwanted signals at each core also includes an additional pair of magnetic cores associated with each pair of magnetic cores in said switch, said additional pair of cores being selected to have substantially the same magnetic characteristics as its associated pair of cores, each said additional pair of cores being coupled to said input coil, to said selecting coils and to an output coil in similar fashion as its associated pair of cores, an additional inhibit coil coupled to the cores in each of said additional pairs of cores, and means to apply a biasing current to said additional inhibit coil to bias said additional cores to the position on their magnetic characteristic at which they nullify in the output coil voltages induced by magnetic excursions caused when said pair of magnetic cores are not selected by excited selecting coils.

10. A signal switching and recording system for recording on a magnetic medium comprising in combination a plurality of magnetic cores, means to saturate all said cores in one polarity of saturation, means including selecting coils coupled to said cores in accordance with a combinatorial code to selectively drive to desaturation from said saturation each of said cores in turn in a desired sequence, an input coil coupled to all of said cores, means to apply signals to said input coil, a plurality of output coils, and a plurality of magnetic transducing heads adapted to be operatively positioned with respect to said medium, each of said output coils respectively coupling a different one of said recording heads to a different one of said cores.

11. A signal switching and recording system for recording on a magnetic medium comprising a plurality of groups of magnetic cores, each group being divided into an integral number of subgroups of cores, means to bias all said cores to saturation, a plurality of output coils, a plurality of magnetic transducing heads, each of said output coils coupling a different one of said magnetic cores to a different one of said heads, said heads being adapted to be operatively associated with said medium, means to selectively transmit a signal through a desired magnetic core to the head coupled thereto to be recorded on said medium including means to drive said desired core to desaturation from said saturation, said driving means including selecting coils coupled to said cores in accordance with a combinatorial code, and means associated with each core to eliminate unwanted signals.

12. A signal switching and recording system as recited in claim 11, said selecting coils including first and second pluralities of selecting coils, each of said first plurality of selecting coils being inductively coupled to all the cores in a different group of cores, each of said second plurality of selecting coils being inductively coupled to all the cores in a different subgroup of cores, a plurality of input coils, each of said input coils being inductively coupled to a different core in each subgroup of cores, means to apply current to the one of said first plurality of selecting coils and to the one of said second plurality of selecting coils which are coupled to a subgroup of cores including said desired magnetic core to desaturate said subgroup of cores, and means to apply a signal to the input coil coupled to said desired core whereby said signal is transmitted only through said core.

13. A signal switching and recording system as recited in claim 12 wherein said means to apply current to one of said first plurality of selecting coils and to one of said second plurality of selecting coils includes a first and second plurality of electron tubes, each tube having anode, cathode and control grid electrodes, each of said first plurality of tubes having a different one of said first plurality of selecting coils as an anode load, each of said second plurality of tubes having a different one of said second plurality of selecting coils as an anode load, and means to selectively apply an exciting signal simultaneously to the grid of one tube in each said first and second plurality of tubes to permit desaturation of the subgroup of cores to which the currents drawn through the coils connected to both excited tubes are applied.

14. A switching device comprising a plurality of magnetic cores each with at least one individual winding for driving to magnetic saturation each core, a first winding means coupled to all said cores, a plurality of second winding means coupled individually to each said core, means including selecting coils coupled to said cores in accordance with a combinatorial code for driving a desired one of said cores from said saturation to a desaturated condition, and means for applying modulated signals to one of said first and second winding means for selective transmission from one to the other of said first winding means and a selected said second winding means.

15. A switching device as claimed in claim 14, said first winding means comprising, for each said core, a coil linkage to said core, said linkages being connected in series, thereby to form a single coil coupled to all said cores, said one of said winding means to which said modulated signals are to be applied being said single coil.

16. A magnetic distributive switch comprising a plurality of magnetic cores, means to saturate said cores at one magnetic polarity including and inhibiting coil inductively coupled to all said cores and means to apply a direct current bias to said inhibiting coil to bias all said cores to a desired saturation, a plurality of selecting coils inductively coupled to said cores in accordance with a desired combinatorial code, means to selectively excite said selecting coils to drive to desaturation from said saturation a desired one of said magnetic cores, a first further coil inductively coupled to all said cores, a plurality of other further coils each of which is inductively coupled to a different one of said cores, means to apply an alternating current to one of said further coils as an input coil, substantial transmission of said alternating current signal between one of said first further coils and said other further coils occurring only through said desired core of said cores.

17. A magnetic switch is claimed in claim 16, wherein said alternating current signal applying means applies said signal to said first further coil.

References Cited in the file of this patent

UNITED STATES PATENTS

| | | |
|---|---|---|
| 2,021,099 | Fitz Gerald | Nov. 12, 1935 |
| 2,611,025 | Jankowski | Sept. 16, 1952 |
| 2,691,152 | Stuart-Williams | Oct. 5, 1954 |
| 2,698,875 | Greenwood | Jan. 4, 1955 |
| 2,730,694 | Williamson | Jan. 10, 1956 |

OTHER REFERENCES

Publication: "A Magnetic Matrix Switch and Its Incorporation Into a Coincident-Current Memory," by Kenneth H. Olsen. Published June 6, 1952. Thesis date: May 15, 1952. Pages 1–23.